United States Patent [19]
Ross

[11] Patent Number: 5,943,029
[45] Date of Patent: Aug. 24, 1999

[54] METHOD AND APPARATUS TO PROVIDE NON-DDC MONITOR CHARACTERISTICS TO SYSTEM SOFTWARE

[75] Inventor: Steven Timothy Ross, Georgetown, Tex.

[73] Assignee: Dell USA, L.P., Round Rock, Tex.

[21] Appl. No.: 08/592,560

[22] Filed: Jan. 26, 1996

[51] Int. Cl.$^6$ .................................................. G09G 1/06
[52] U.S. Cl. ............................................. 345/11; 345/132
[58] Field of Search ................................. 345/132, 199, 345/186, 204, 516, 112, 115, 10, 11, 13; 348/441, 554

[56] References Cited

U.S. PATENT DOCUMENTS

| | | | |
|---|---|---|---|
| 4,918,436 | 4/1990 | Johary | 345/132 |
| 5,448,697 | 9/1995 | Parks et al. | |
| 5,483,260 | 1/1996 | Parks et al. | |
| 5,602,567 | 2/1997 | Kanno | 345/132 |
| 5,648,795 | 7/1997 | Vouri et al. | 345/132 |
| 5,654,738 | 8/1997 | Spurlock | 345/132 |
| 5,675,364 | 10/1997 | Stedman et al. | |

OTHER PUBLICATIONS

"Display Data Channel Standard", Version 1.0, Copyright 1993, 1994 Video Electronics Standards Association, Aug. 12, 1994, pp. 1–28.

*Primary Examiner*—Chanh Nguyen
*Attorney, Agent, or Firm*—Skjerven, Morrill, MacPherson, Franklin & Friel L.L.P.; Stephen A. Terrile

[57] ABSTRACT

A method and apparatus for providing non-DDC monitor characteristics to system software is disclosed. The present invention is primarily directed to use in personal computers. The method of the present invention includes obtaining information from a user regarding specific capabilities of an attached non-DDC monitor. This information is then stored in system storage in a format similar to that sent by a DDC monitor. A BIOS call from a video subsection receives this information when a DDC monitor is not attached and utilizes it to determine the proper refresh rate at which to set an attached video controller.

34 Claims, 7 Drawing Sheets

360 Monitor: [Dell GPD-16C          ]
365 Refresh rate at resolution of 640x480:    [85Hz          ]
370 Refresh rate at resolution of 800x600:    [75Hz          ]
375 Refresh rate at resolution of 1024x768:   [70Hz          ]
380 Refresh rate at resolution of 1280x1024:  [Interlaced    ]
385 Refresh rate at resolution of 1600x1200:  [Not Supported]
390 Use Monitor's DDC data:   [Only if non-DDC monitor detected]

FIG. 4

| AH at entry | Function | Description |
|---|---|---|
| 00h | Get XB_MONITOR_INFO version | Returns the version of the XB_MONITOR_INFO call Current version = 0 |
| 01h | Get Monitor Name | Get/Set a code value uniquely identifying the monitor selected |
| 02h | Set Monitor Name | |
| 03h | Get Resolution/Refresh Pair | Get/Set a refresh rate at a designated resolution |
| 04h | Set Resolution/Refresh Pair | |
| 05h | Get Monitor Flags | Get/Set flags controlling the monitor subsystem |
| 06h | Set Monitor Flags | |
| 07h | Get fake EDID | Get/Set the fake EDID |
| 08h | Set fake EDID | |
| 09h | Get DPMS capability | Get/Set monitor's ability to conserve power |
| 0Ah | Set DPMS capability | |
| 0Bh | Get EDID Version | Returns the version and revision of the EDID that is implemented by the system |

FIG. 5

METHOD AND APPARATUS TO PROVIDE NON-DDC MONITOR CHARACTERISTICS TO SYSTEM SOFTWARE

BACKGROUND OF THE INVENTION

The present invention relates to a method and apparatus to provide non-Display Data Channel (DDC) monitor characteristics to computer system software.

Presently, personal computers utilize monitors which may be either DDC or non-DDC compatible. A DDC monitor includes a storage device, such as an EEPROM, which stores information regarding the capabilities of the monitor, such as its resolution and refresh rates. This information is stored in a data format called an EDID (Extended Display Identification). The EDID is a standard data format developed by VESA (Video Electronics Standards Association) to promote greater monitor/host computer compatibility. At the present time, the current EDID data format is that described in Appendix D of Display Data Channel (DDC™) Standard, version 1.0 revision 0, dated Aug. 12, 1994, the disclosure of which is expressly incorporated herein by reference. A non-DDC monitor does not have such information present.

In a personal computer utilizing a DDC monitor, system software accesses the DDC information stored in the monitor. System software also determines the video controller installed in the system. A video controller is used to control and configure the video data sent to a monitor. The system software then compares the refresh rate obtained from the DDC monitor to the capabilities of the video controller to determine the proper refresh rate at which to set the video controller, which in turn controls the monitor.

At the present time, if a personal computer utilizes a non-DDC monitor, information regarding the monitor's capabilities may be determined using a program which prompts the user for this information. Alternately, the system software may test the monitor to determine its characteristics. The system software then determines the maximum refresh rate that is compatible with the video controller and sets the video controller to that refresh rate. Alternately, the program may allow the user to specify non-maximum refresh rates for each screen size. At the present time, these are the only methods available for users to set refresh rates.

Among the drawbacks to the present scheme for handling non-DDC monitors is that its implementation requires many manufacturer-specific subfunctions and BIOS (Basic Input/Output System) calls to operate. BIOS is the firmware in a personal computer that interfaces directly with the hardware to perform input/output and other low-level functions. As a result, a single program must have intimate knowledge of each video subsystem it is capable of controlling/configuring. This makes it difficult for the program to support video add-on adapter cards. It would therefore be desirable to create a method to provide non-DDC monitor characteristics to system and application software using a standard BIOS call.

SUMMARY OF THE INVENTION

The present invention solves the above-described problems by creating a method and apparatus to provide non-DDC monitor characteristics to system software.

The present invention includes a machine-executed method for providing non-DDC monitor characteristics to system software of a computer system upon the request of the system software. The computer system may include, for example, a central processing unit (CPU) connected to a main memory via a bus and further connected via the bus to the system software. This system software may include BIOS software stored in Read-Only Memory (ROM). The CPU is further connected to nonvolatile system storage via the bus. The computer system also has a video system which includes a non-DDC monitor connected to a video controller connected to the bus, and video system POST & BIOS software. The method includes the steps of: obtaining the non-DDC monitor characteristics from a user interface program; storing these characteristics in a predetermined storage location which the system software is capable of accessing; initializing the computer system; and retrieving the characteristics from the storage location when the system software requests the information for use in video system software.

In an alternate embodiment of the present invention, a machine-executed method is used to override the information sent by a DDC monitor to a computer system as described above. The method includes the steps of: obtaining from a user a request to override DDC information; obtaining from the user alternate monitor characteristics to replace the DDC information; storing the characteristics in a preselected storage location which may be accessed by system software; initializing the computer system; and retrieving the monitor characteristics from the storage location when requested by system software for use in video system software.

BRIEF DESCRIPTION OF THE DRAWINGS

FIG. 4 is a close-up of an exemplary embodiment of the screen selections for the System Setup Program.

FIG. 5 is a table of the functions available from a single BIOS entry point.

DETAILED DESCRIPTION

One implementation of the invention is described here for purposes of illustration, namely a machine-executed method of providing non-DDC monitor characteristics to system software.

Figure 1:
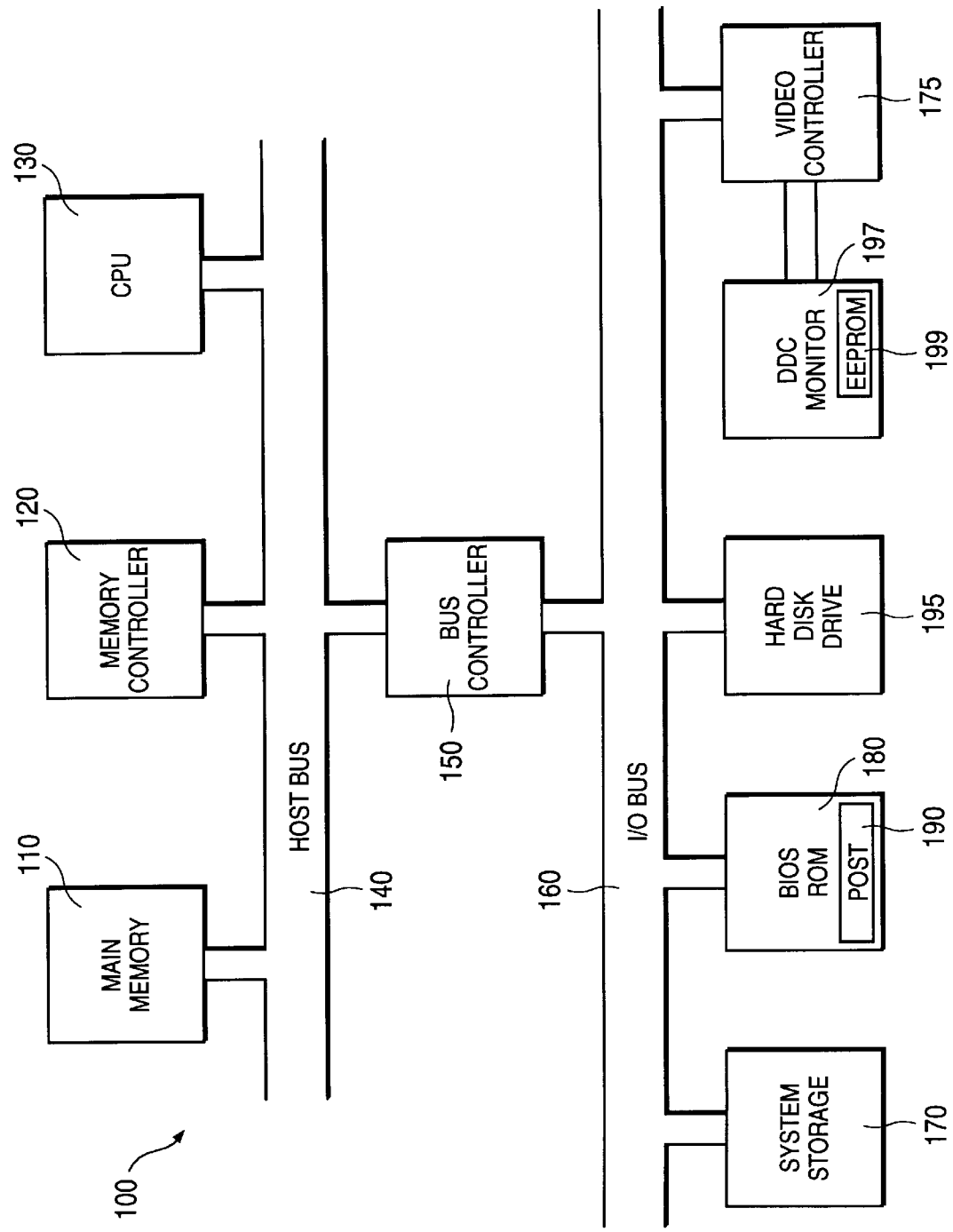
FIG. 1 is a functional block diagram of a computer system including depictions of components including a DDC monitor used in a method in accordance with the present invention.

FIG. 1 is a system block diagram of a personal computer (PC) 100 in which the method of the present invention may be implemented.

The disclosed exemplary embodiment, PC 100 comprises a central processing unit (CPU) 130 connected to other hardware devices via host bus 140. For example, CPU 130 is connected to main memory RAM 110 through a memory controller 120 and host bus 140. CPU 130 is further connected to other hardware devices via host bus 140, bus controller 150 and I/O bus 160. These other hardware devices include, for example, BIOS ROM 180, in which a Power On Self-Test (POST) program 190 is stored, hard disk drive 195, a non-volatile system storage device, such as CMOS 170, video controller 175, and DDC monitor 197 which includes a storage device, such as EEPROM 199, in which the DDC or monitor characteristics data is stored.

Figure 2:
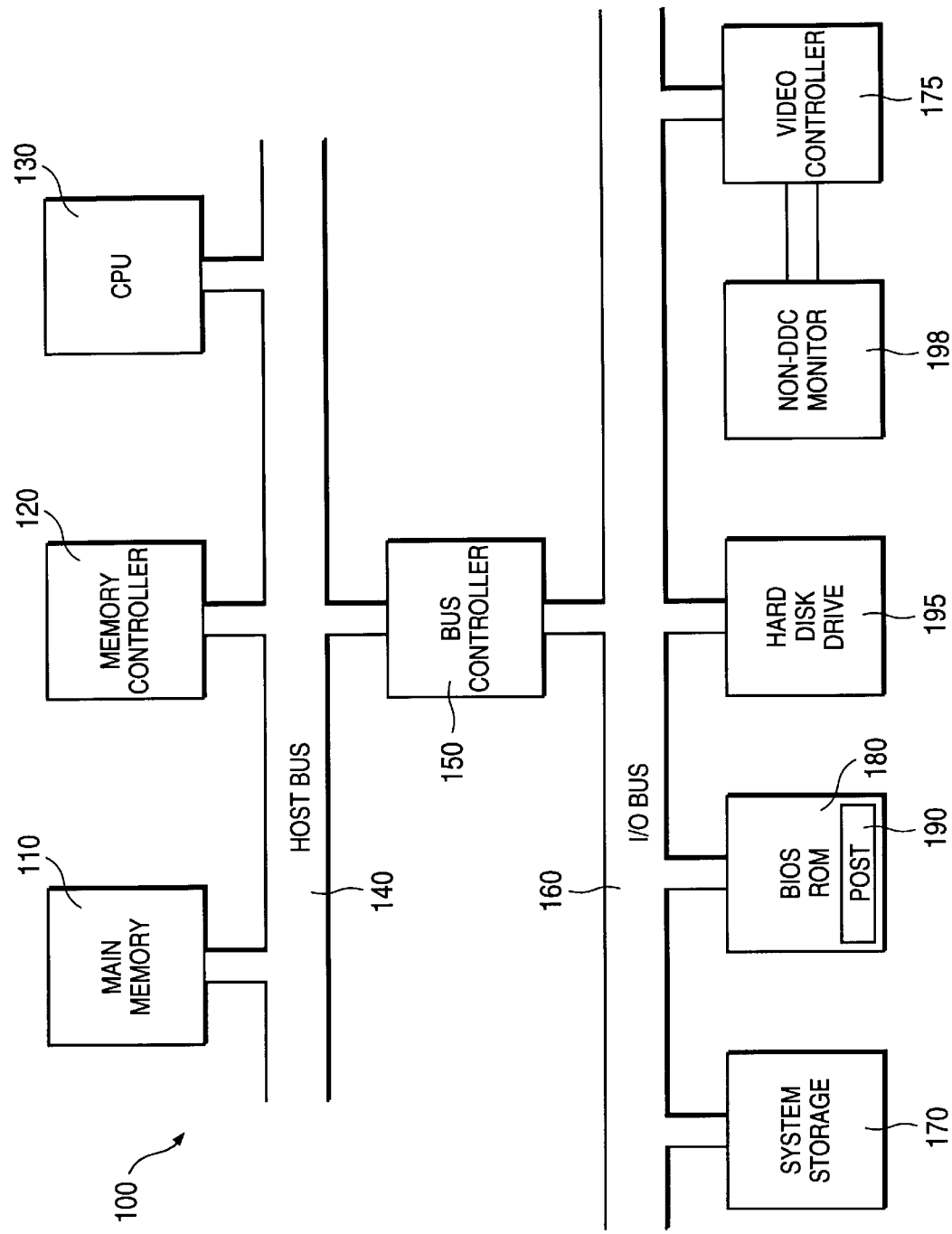
FIG. 2 is a functional block diagram of a computer system including depictions of components including a non-DDC monitor used in a method in accordance with the present invention.

FIG. 2 is a system block diagram of a computer system in which the method of the present invention may be practiced. Note that the only difference between FIG. 1 and FIG. 2 is the presence of non-DDC monitor 198, which does not have any internal storage device, such as EEPROM 199.

The machine-executed method of the present invention may be invoked by the user's request. The method may be performed by executable computer software contained in BIOS ROM 180, and actual implementation of such computer code might be executable, for example, on a Dell PC based on the Intel 80×86 or Pentium™ microprocessors, or on other suitable processor-based computer systems.

It is noted that all of the elements of the PC shown in FIG. 1 and FIG. 2 may not be necessary to understand the operation of the present invention. Further, in some instances, other elements which are necessary have been omitted for simplicity. In other instances, certain elements of a computer system unnecessary to understand the present invention have nonetheless been included to provide a more complete overview of the entire computer system in which the method of the present invention might be performed.

Figure 3:
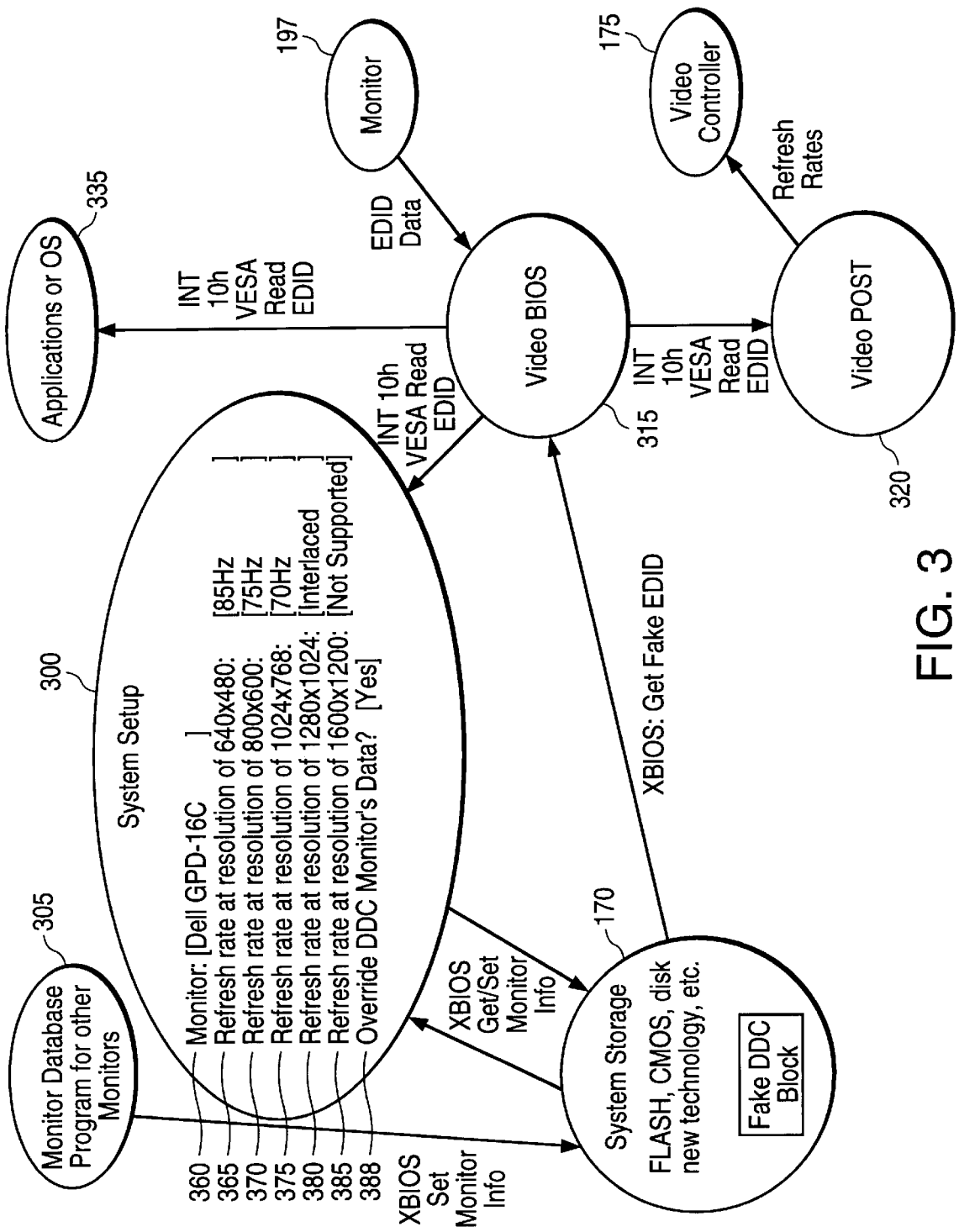
FIG. 3 is a functional block diagram depicting both hardware and software elements of the present invention.

FIG. 3 shows a functional block diagram including hardware and software elements of the present invention. FIG. 3 shows user interface programs 300 and 305. The information obtained from these programs is stored in system storage 170. Upon reboot or startup, the video POST uses the video BIOS 315, which may be stored in POST/BIOS ROM 180, to request EDID information, which is be sent to it from either an attached DDC monitor 197 or system storage 170. The refresh information from this EDID is sent to video POST 320, which may be stored in POST/BIOS ROM 180. In video POST 320, this information is compared to refresh rates of video controller 175. The resulting maximum coinciding rate is identified and sent to set up video controller 175. Also, application software or operating system (OS) software 335 may request this information from video BIOS 315.

As FIG. 3 depicts, a setup program 300, which in an exemplary embodiment is System Setup Program (SSP) 300, is used as the primary user interface for entering monitor information. As monitor information is entered by the user, it is stored into the system using a set of functions available under a single XBIOS (XBIOS denotes a manufacturer-specific BIOS call) entry point capable of storage and retrieval of all of the monitor information. XBIOS may be stored, for example, in BIOS ROM 180. The information obtained from the user is stored in nonvolatile storage 170. The memory device utilized to store the data may be, for example, FLASH memory, CMOS storage, disk, or any others known in the art.

FIG. 3 also shows the Monitor Database Program (MDP) 305. Since only a limited number of monitors will be available as choices in SSP 300, a MDP 305 allows the user to select from a more extensive list of monitors. The information in this list includes, for example, the resolutions and refresh rates of various monitors and other information that is included in the EDID structure. As with SSP 300, the user will select the monitor to be used and provide data regarding the monitor's characteristics. Once the information is entered through SSP 300 or MDP 305, the system must be rebooted for the changes to take effect.

Upon reboot, the system will perform initialization. During the video POST 320 portion of reboot, a call is made to the video BIOS's 315 VESA standard call for retrieving DDC information from the monitor 197. This VESA standard function, however, is modified such that the EDID returned will come from either an attached DDC monitor 197, or, if a non-DDC monitor 198 is attached, the EDID will be emulated using a combination of a generic, hard-coded DDC block and the information that was entered during SSP 300 or MDP 305. The video POST 320 will use the EDID to setup the video controller's 175 refresh rates to the maximum possible value that both the monitor 198 and controller 175 can provide for each of the modes available.

Once the monitor data is stored in the system, any program that requests DDC information will be returned EDID data from either the monitor itself, or the emulated EDID provided by the system because the VESA standard call has been modified. This allows a non-DDC monitor 198 to appear as a DDC monitor 197 to the calling program. For example, Microsoft Windows 95 will detect the non-DDC monitor 198 in the same manner it would detect a DDC monitor 197 and automatically configure the system accordingly.

FIG. 4 shows a close-up of the screen display which the user encounters upon entering an exemplary embodiment of the SSP 300. The list of monitors for which information is available may include monitors of one or more manufacturers. The SSP 300 allows the user to select the appropriate monitor from the list of monitors. The help text for the monitor selection will refer the user to the MDP 305 and the manufacturer's system user's guide to enter proper information for monitors not included in the SSP 300. The MDP 305 allows the user to set up the system for monitors not in the SSP 300, while the system user's guide will have a list of the necessary parameters for the monitors contained in the MDP 305. A user may also be able to set up a monitor not included in the SSP 300, or to set up a DDC monitor 197 from SSP 300 by selecting the "CUSTOM or DDC" Monitor option 360 and entering the appropriate parameters for their monitor, as will be discussed in further detail below.

The purpose of a separate SSP 300 and MDP 305 is dictated by space considerations. Since the additional system storage 170 space (for example, FLASH memory) required for a larger database may not always be available, a tradeoff is made between using SSP 300 to make the monitor control readily available, and limiting the monitors supported to only specific monitors. The present invention, however, does not require the presence of both a SSP 300 and a MDP 305 in order to function, and may operate without the presence of one of the programs.

In the SSP 300, the user may, for example, use the arrow keys to scroll through a list of monitors present. As the list is scrolled, the maximum refresh rates for the current monitor selection will be displayed and the resolutions that are not supported will be dimmed. Once a monitor is chosen from the Monitor option 360, the user will be able to select a refresh rate less than the maximum for each of the resolution settings supported by that monitor. As soon as the user begins to change the Monitor selection 360, the Use Monitor's DDC Data field 390 will be set to "Only if non-DDC monitor detected" to prevent the user from accidentally overriding a DDC monitor 197.

The refresh rate selections are preferably limited to the maximum supported by the monitor selected. Similarly, the resolutions for which a user can set the refresh rate are preferably limited to those supported by the monitor selected. Selecting "CUSTOM or DDC" in the Monitor option 360 will cause SSP 300 to first determine the modes supported by a DDC monitor 197 that may be attached and limit the fields to those modes. This will prevent the user from attempting to run their DDC monitor 197 beyond its capabilities, while still allowing the user to set less than maximal refresh rates or override incorrect EDID data that may be provided by a faulty DDC monitor 197. However, if a faulty DDC monitor 197 reports refresh rates that are less than the monitor is actually capable of supporting, the user will be limited to the rates provided by the monitor and therefore will not be able to drive the monitor at its true refresh rate limits. If the "CUSTOM or DDC" Monitor option 360 is selected and a non-DDC monitor 198 is attached, all of the resolutions and refresh rates supported by the implemented revision of the EDID block will become accessible to the user.

The resolutions for which the user may enter refresh rates will be determined by the revision of the DDC information data that the system is designed to support. For example, in the current version (1.0) of the Display Data Channel (DDCTN standard, the 1600×1200 resolution modes are not explicitly supported, so a system designed to support the current version would not have any lines in SSP 300 referring to these modes. The refresh rates supported by SSP 300 will also correspond to those explicitly supported in the revision of the DDC information data that is implemented by the system.

The Override DDC Monitor's Data? option 388 of SSP 300 allows the user to specify that an emulated EDID stored in the system storage 170 is to be used instead of any EDID that may be returned from a DDC monitor 197. When the "CUSTOM or DDC" Monitor option is selected and a non-DDC monitor 198 is attached, or when a non-DDC monitor 198 is selected, the Override option 388 will be set to "No" and will not be controllable by the user to prevent the user from accidentally overriding the parameters of a DDC monitor 197 that may be attached later.

In order to fit the monitor database in the system storage 170 (for example, FLASH memory), it is preferable that the refresh rate/resolution information for each monitor 198 be stored in a bit-field format similar to the current EDID structure. This bit-field representation for each monitor 198 will depend on the revision of the EDID that the system is implementing. For example, for version 1.0, revision 0 of the DDC Standard, it is recommended that the necessary data is stored in the same 3-byte format used in the Established Timings section of the EDID structure in order to simplify the storage and retrieval code.

As the EDID is redefined and extended with future revisions of the DDC Standard, it is anticipated that the amount of required system storage 170 will increase. At present, the EDID is being redefined by the VESA committee to include support for more refresh rates at the resolutions currently supported by the Established Timings section, as well as higher resolutions and refresh rates. For example, a proposed revision (version 1.0, revision 1) would redefine the Manufacturer's Timings byte of the Established Timings to include 85 Hz support as well as support for 1600×1200 resolution modes. These and future revisions are anticipated, and may be supported by the present invention by incorporating the revised support rates into SSP 300 and MDP 305.

The data that is stored in the system storage 170 will be accessible using multiple functions within a single XBIOS entry point, for example, XB_MONITOR_INFO. The available functions for this exemplary XBIOS entry point are listed in FIG. 5.

It is not intended that programs store an entire EDID in the system each time a monitor 198 is changed. Instead, it is preferred that a generic EDID be hard-coded in the system storage 170, for example, in FLASH memory. When a monitor 198 is updated or changed, the program should only store the pertinent information describing the monitor 198, namely the monitor name along with a set of resolution/refresh rate pairs, the DDC override flag, and the DPMS capabilities. The format described in FIG. 5 above is preferred as a compact format for storing this data.

The Get/Set FAKE EDID XBIOS function, as described in further detail below, will then be responsible for returning the emulated EDID from the system with the resolution/refresh rate pairs substituted in the appropriate places. In this way, the modifiable data can be stored in a very small piece of the system's easily accessible, non-volatile storage 170, while the large block of EDID data can be stored permanently in a region of the system that will not be updatable during runtime, for example in FLASH memory.

The following paragraphs describe in further detail the specific functions which are available from the XBIOS entry point which is shown in FIG. 5. These functions are exemplary of functions which may be utilized to provide non-DDC information to system software, and is provided solely as one possible embodiment of the present invention.

The Get/Set Monitor Name function obtains and stores a code value which uniquely identifies the monitor selected. A unique DDC product ID (2 bytes) will be generated and assigned to each non-DDC monitor 198 stored in the SSP 300. This 2-byte value is stored in the ROM-based list of monitors and is stored in the system as the unique identifier of each monitor. SSP 300 is able to reference this product ID back to the monitor's string name and its capabilities. A product ID of 0000h is reserved for the "CUSTOM or DDC" selection of the Monitor option 360 of SSP 300.

During the Set subfunction, the monitor's product ID is passed as a word value in the buffer pointed to by ES:BX (which are registers within an Intel processor that can be used to hold a segment and offset pointer) and stored in the system's non-volatile storage 170. When the MDP 305 stores a non-DDC monitor 198, it will store the monitor's name as "CUSTOM or DDC." The Get subfunction will return the monitor's product ID as a word value pointed to by ES:BX.

The Get Resolution/Refresh Rate Pair function requires the caller to pass an index value in ES:BX which represents the index of the pair in the system's list of currently set resolution/refresh rate pairs. It is intended that the caller will begin with an index value of zero and traverse the list of pairs until the call returns a resolution/refresh rate of all zeros which will indicate the end of the list. The Set function requires a resolution/refresh rate pair to be passed in the buffer pointed to by ES:BX, thereby requiring the XBIOS code to determine if the system supports that resolution and refresh rate and either make use of the refresh rate information or ignore it altogether. The buffer is allocated by the caller and the pointer to the buffer is passed to the XBIOS function. The Set function will also rely on a control byte passed in the buffer pointed to by ES:BX to determine whether the resolution/refresh rate pair should be set or cleared, or if the entire resolution/refresh rate table should be cleared.

The Get/Set Flag functions relate to the selection of the Override field which the user may select. The Get subfunction will send the contents of the flag stored at a position pointed to by ES:BX. The value of this flag is equal to one if the flag is set to override a DDC monitor 197, and the flag is equal to zero if the flag is set to not override a DDC monitor 197. The Set subfunction stores in the buffer the value of selection made by the user. However, if a non-DDC monitor 198 is attached, or when a non-DDC monitor 198 is selected, the flag will be set to zero regardless of the decision elected by the user.

The Get/Set Fake EDID function has a pointer to a preallocated 128-byte block of RAM in system storage 110 which is passed in ES:BX. The Get function copies the contents of the EDID stored in the system storage 170, which may be, for example, FLASH memory, substituting the previously stored resolution/refresh rate fields, the DPMS information, the unique product ID, and a recalculated checksum, into the block pointed to by ES:BX. The Set function uses the data block pointed to by ES:BX to determine the pertinent parameters for which non-volatile storage has been allocated and store them in the system's non-volatile storage 170. In an alternative embodiment, a more robust Set function would be able to store the entire 128-byte EDID pointed to by ES:BX in the system's non-volatile storage 170.

The Get/Set DPMS Capability subfunction calls to the location pointed by ES:BX to determine whether DPMS capability is present in the monitor. In the Set function, the routine stores the DPMS data at the location pointed by ES:BX.

The Get/Set. EDID Version call provides a simple means for a calling application to determine the version of the EDID standard that is implemented by the system. The version and revision returned by this call allow a program to determine what bit fields, and monitor parameters the system supports as well as the format of the EDID if the system supports writing of the EDID. The video BIOS 315 for add-in video cards will need to make this call to determine how to interpret the EDID that is returned by the XBIOS.

The hard-coded EDID preferably represents a non-specific, generic monitor. A unique product ID may be assigned by the manufacturer to represent each different monitor described by the emulated EDID. The dates preferably correspond to those of the BIOS image. The checksum should preferably be stored for the block, although the Get EDID XBIOS function will have to recalculate and substitute for this byte each time it copies the EDID into the supplied RAM 110 buffer.

Figure 6:
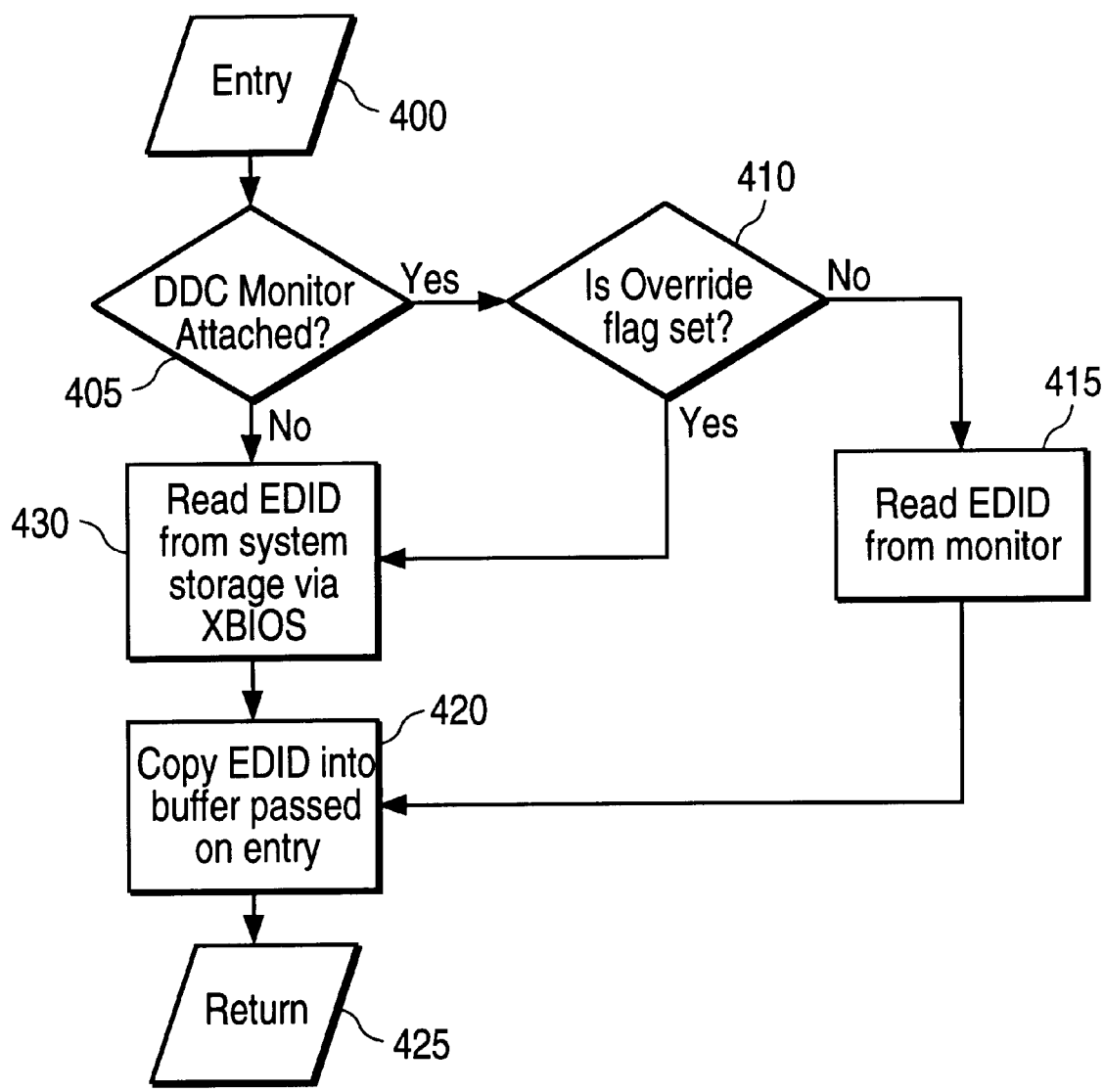
FIG. 6 is a flow diagram of the modified standard VESA READ EDID BIOS call, in accordance with the present invention.

A key aspect of the present invention is that the VESA sub-function 15h, routine 01h (Read EDID) is modified to be able to return EDID data from either an attached DDC monitor 197 or from the system storage 170. FIG. 6 depicts the modified flow of this routine in accordance with the present invention. The modified VESA subfunction is entered at step 400. At step 405, the routine determines whether a DDC Monitor 197 is attached. If a DDC monitor 197 is attached, control passes to step 410, otherwise control passes to step 430. At step 410, the routine then determines whether the Override flag is a binary '1', indicating that the flag is set. If the flag is not set, control passes to step 415. At step 415, the EDID is read from the DDC monitor 197. At step 420, the EDID is copied into the RAM 110 buffer. At step 425, the function returns to its calling program.

If, at step 405, the routine determines that a DDC monitor 197 is not attached, control is passed to step 430. Alternately, if the Override flag is set, in step 410, control is passed to step 430. At step 430, the emulated EDID which is stored in system storage 170 via XBIOS is read. At step 420, the routine will then copy the emulated EDID into the RAM 110 buffer at the address passed on entry into the subroutine. At step 425, the function returns to its calling program.

Another aspect of the present invention expands the video POST 320 to set up the video controller's 175 refresh rate bits based on the monitor's 198 parameters. In past Dell systems, for example, this was performed by the system POST using both the VESA call to read the EDID and a manufacturer's proprietary BIOS call to get information about the video controller and set the refresh rates. Using the monitor 198 parameters embedded in the EDID and a hard-coded table stored in the video POST 320 describing the video controller's 175 capabilities, the video POST 320 will determine the maximum refresh rates for the system and store them in the video controller 175. The video controller 175 then uses this information to configure the monitor 198.

Figure 7:
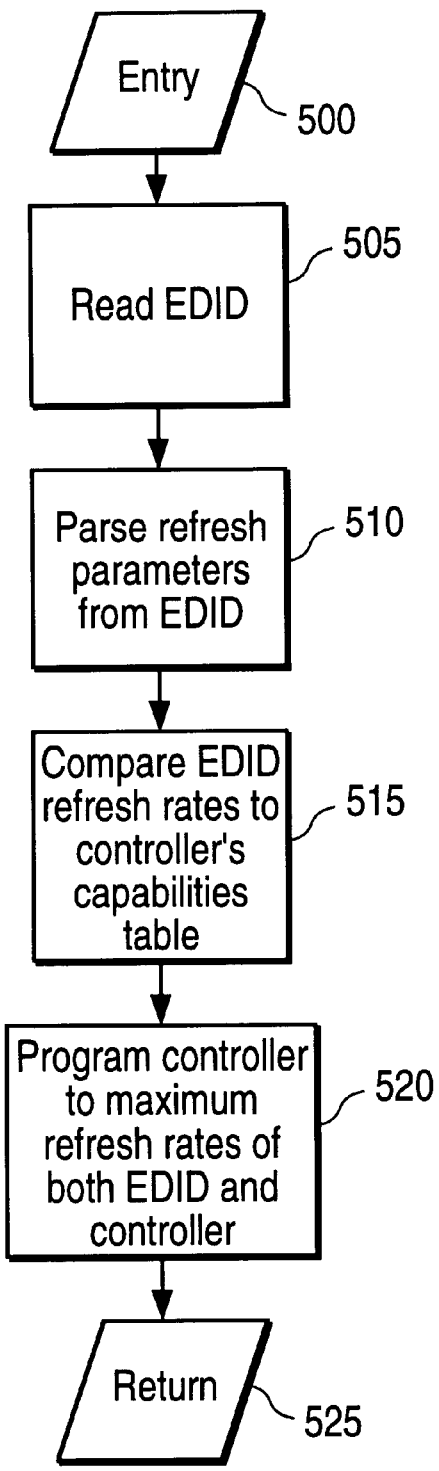
FIG. 7 is a flow diagram of the video POST refresh rate configuration.

FIG. 7 is the flow diagram for the video POST 320 refresh rate configuration. As shown in FIG. 7, the routine is entered at step 500. At step 505, the EDID is read from either the system storage 170 or an attached DDC monitor 197. At step 510, the refresh parameters are parsed from the remaining EDID data. At step 515, the refresh information is then compared to the video controller's 175 refresh capabilities table which is stored in the video POST 320. The maximum rate at which these two rates match is the maximum refresh rate. At step 520, this maximum rate is then returned to the video controller 175, which is thereby programmed to operate at this maximum rate. At step 525, the routine then returns to its calling program.

Since the video POST 320 has intimate knowledge of the video subsystem, it is a more logical place for such a procedure to exist than in the system POST. By placing this routine in the video POST 320, the present invention eliminates the need for the manufacturer's proprietary BIOS call.

The MDP 305 provides the user with the ability to configure their system for their non-DDC monitor 198 by simply selecting their monitor name from a list. Once the user has completed entering monitor data, the MDP 305 will store the data in the system using the XBIOS calls in a similar fashion to SSP 300. The monitor name will always be stored as "CUSTOM" since this is the only product ID name available.

Those of ordinary skill in the art will recognize that there are many alternative implementations to provide non-DDC monitor characteristics to system software. The specification above is just one specific implementation of such a system. Therefore, it will be appreciated by those of ordinary skill, having the benefit of this disclosure, that numerous variations from the foregoing illustration will be possible without departing from the inventive concept described therein. Accordingly, it is the claims set forth below, and not merely the foregoing illustrations, which are intended to define the exclusive rights claimed in this application.

What is claimed is:

1. A machine-executed method for permitting a user to override predetermined characteristics values of a Display Data Channel (DC) monitor attached to a computer system, said computer system including a processor connected to main memory via a bus and further connected via the bus to system software and connected to non-volatile system storage via said bus, and further having a video system including a monitor connected to a video controller connected to said bus and video system software connected to said bus, said DDC monitor having associated characteristics values, including maximum-permitted characteristics values, comprising:

receiving from said user a request to override said DDC monitor characteristics values;

determining whether said monitor attached to said computer system is a DDC-compliant monitor;

if said attached monitor is a DDC-compliant monitor, then performing the steps of:

determining said maximum-permitted characteristics values of said DDC monitor;

permitting said user to select new characteristics to be associated with said DDC monitor, said new characteristics being restricted to only those characteristics less than or equal to said maximum-permitted characteristics for said DDC monitor; and if said attached monitor is a non-DDC-compliant monitor, then performing the step of:

preventing said user from overriding said DDC monitor characteristics values.

2. The machine-executed method of claim 1 wherein the permitting said user to select new characteristics to be associated with said DDC monitor, further comprises:

obtaining from said user said new monitor characteristics information to replace said monitor-supplied characteristics information of said DDC monitor;

storing said new monitor characteristics information in a storage location accessible by said system software; and upon initialization of said computer system, returning said new monitor characteristics information from said storage location upon request of said system software.

3. The machine-executed method of claim 2 further comprising comparing the monitor's characteristics to the video controller's characteristics.

4. The machine-executed method of claim 3 further comprising selecting compatible characteristics of the monitor and the video controller.

5. The machine-executed method of claim 4 further comprising transmitting the compatible characteristics to the video controller.

6. The machine-executed method of claim 3 wherein the compatible characteristics comprise a maximum refresh rate for which the monitor and the video controller's refresh rates coincide.

7. The machine-executed method of claim 2 wherein the obtaining the non-DDC monitor characteristics further comprises:

requesting a user to enter information regarding the monitor's capabilities; and permitting the user to select information regarding the monitor's capabilities from a database stored in system storage.

8. The machine-executed method of claim 7 wherein the information regarding the monitor's capabilities is stored in nonvolatile system storage.

9. The machine-executed method of claim 2 wherein the system software request comprises a call.

10. A computer program for performing the method of claim 1.

11. In a computer system including a video controller and having a monitor attached, a machine-executed method for transmitting non-DDC monitor characteristics to system software from system storage by modifying a standard Video Electronics Standards Association (VESA) function requesting Extended Display Identification Data (EDID) information, comprising:

determining whether a DDC monitor is attached to said computer system;

if said attached monitor is a DDC-compliant monitor, then performing the steps of:

determining whether a user of said computer system is requesting to override characteristics associated with said DDC monitor, said characteristics being stored as EDID information readable by said computer system;

if said user is requesting to override said characteristics of said DDC monitor, then performing the steps of:

creating emulated EDID information based upon user-supplied or based upon predetermined values;

storing said emulated EDID information in said system storage; and reading said emulated EDID information from said system storage; and if said attached monitor is a non-DDC-compliant monitor, then performing the steps of:

creating emulated EDID information based upon user-supplied values; and reading said emulated EDID information from system storage.

12. The machine-executed method of claim 11, wherein the performing the creating emulated EDID information based upon user-supplied values further comprises:

obtaining said non-DDC monitor characteristics from a user interface program; and storing said non-DDC monitor characteristics in a predetermined storage location accessible by the system software, the non-DDC monitor characteristics being stored in an emulated EDID format.

13. The machine-executed method of claim 12, wherein the performing the reading said emulated EDID information from system storage further comprises:

retrieving the non-DDC monitor characteristics from the predetermined storage location upon request of the system software for use in video system software.

14. The machine-executed method of claim 12, wherein the user interface program includes:

requesting a user to enter information regarding the monitor's capabilities; and permitting the user to select information regarding the monitor's capabilities in a database stored in system storage.

15. The machine-executed method of claim 12, wherein the predetermined storage location accessible by the system software is accessible via a Basic Input/Output System (BIOS) call.

16. The machine-executed method of claim 11, wherein the determining whether a DDC monitor is attached to said computer system further comprises:

comparing said monitor's characteristics to the video controller's characteristics;

selecting compatible characteristics of said monitor and the video controller; and transmitting the compatible characteristics to the video controller.

17. The machine-executed method of claim 16 wherein the compatible characteristics comprise a maximum refresh rate at which the monitor and the video controller's refresh rates coincide.

18. A computer program for performing the method of claim 11.

19. A computer system comprising:

a memory;

a bus a processor coupled to the memory via the bus;

system software coupled to the processor via the bus;

non-volatile system storage coupled to the processor via the bus;

a video system including a video controller coupled to the bus;

a monitor coupled to the video controller, the monitor having associated characteristics values, including maximum-permitted characteristics values;

a video system software coupled to the bus, the video system software including:

means for receiving from a user a request to override the Display Data Channel (DDC) monitor characteristics values means for determining whether the monitor attached to the computer system is a DDC-compliant monitor;

DDC-compliant monitor means for use when the attached monitor is a DDC-compliant monitor, the DDC-compliant monitor means including:

means for determining the maximum-permitted characteristics values of the DDC monitor; and means for permitting the user to select new characteristics to be associated with the DDC monitor, the new characteristics being restricted to only those characteristics less than or equal to the maximum-permitted characteristics for the DDC monitor if the attached monitor is a DDC-compliant monitor; and non-DDC-compliant monitor means for use when the attached monitor is not a DDC-compliant monitor, the non-DDC-compliant monitor means including:

means for preventing the user from overriding the DDC monitor characteristics values if the attached monitor is a non-DDC-compliant monitor.

20. The computer system of claim 19 wherein the means for permitting the user to select new characteristics to be associated with the DDC monitor, further comprises:

means for obtaining from the user the new monitor characteristics information to replace the monitor-supplied characteristics information of the DDC monitor;

means for storing the new monitor characteristics information in a storage location accessible by the system software; and means for returning the new monitor characteristics information from the storage location upon request of the system software upon initialization of the computer system.

21. The computer system of claim 20 further comprising means for comparing the monitor's characteristics to the video controller's characteristics.

22. The computer system of claim 21 further comprising means for selecting compatible characteristics of the monitor and the video controller.

23. The computer system of claim 22 further comprising means for transmitting the compatible characteristics to the video controller.

24. The computer system of claim 21 wherein the compatible characteristics comprise a maximum refresh rate for which the monitor and the video controller's refresh rates coincide.

25. The computer system of claim 20 wherein the means for obtaining the non-DDC monitor characteristics comprises a user interface program stored in non-volatile system storage.

26. The computer system of claim 25 wherein the information regarding the monitor's capabilities is stored in nonvolatile system storage.

27. The computer system of claim 21 wherein the system software request comprises a call.

28. A computer system comprising:

a memory;

a bus;

a processor coupled to the memory via the bus;

system software coupled to the processor via the bus;

system storage coupled to the processor via the bus;

means for transmitting non-DDC monitor characteristics to the system software from the system storage by modifying a standard Video Electronics Standards Association (VESA) function requesting Extended Display Identification Data (EDID) information, the means for transmitting including:

means for determining whether a DDC monitor is attached to the computer system;

DDC-compliant monitor means for use when the attached monitor is a DDC-compliant monitor, the DDC-compliant monitor means including:

means for determining whether a user of the computer system is requesting to override characteristics associated with the DDC monitor, the characteristics being stored as EDID information readable by the computer system;

means for creating emulated EDID information based upon one of user-supplied and predetermined values if the user requests to override the characteristics of the DDC monitor;

means for storing the emulated EDID information in the system storage if the user requests to override the characteristics of the DDC monitor; and means for reading the emulated EDID information from the system storage if the user requests to override the characteristics of the DDC monitor; and non-DDC-compliant monitor means for use when the attached monitor is not DDC-compliant, the non-DDC-compliant monitor means including;

means for creating emulated EDID information based upon user-supplied values; and means for reading the emulated EDID information from system storage.

29. The computer system of claim 28 wherein the means for creating emulated EDID information based upon user-supplied values further comprises:

means for obtaining the non-DDC monitor characteristics from a user interface program; and means for storing the non-DDC monitor characteristics in a predetermined storage location accessible by the system software, the non-DDC monitor characteristics being stored in an emulated EDID format.

30. The computer system of claim 29 wherein the means for reading the emulated EDID information from system storage further comprises:

means for retrieving the non-DDC monitor characteristics from the predetermined storage location upon request of the system software for use in video system software.

31. The computer system of claim 29 wherein the user interface program includes:

means for requesting a user to enter information regarding the monitor's capabilities; and means for allowing the user to select information regarding the monitor's capabilities from a database stored in system storage.

32. The computer system of claim 29 wherein the predetermined storage location accessible by the system software is accessible via a Basic Input/Output System (BIOS) call.

33. The computer system of claim 28 wherein the means for determining whether a DDC monitor is attached to said computer system further comprises:

means for comparing said monitor's characteristics to the video controller's characteristics;

means for selecting compatible characteristics of said monitor and the video controller; and means for transmitting the compatible characteristics to the video controller.

34. The computer system of claim 33 wherein the compatible characteristics comprise a maximum refresh rate at which the monitor and the video controller's refresh rates coincide.

* * * * *